US012469459B2

(12) United States Patent
Lee

(10) Patent No.: US 12,469,459 B2
(45) Date of Patent: Nov. 11, 2025

(54) DISPLAY DEVICE

(71) Applicant: LG Display Co., Ltd., Seoul (KR)

(72) Inventor: Junwon Lee, Gyeongsan-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/198,978

(22) Filed: May 18, 2023

(65) Prior Publication Data

US 2024/0046882 A1 Feb. 8, 2024

(30) Foreign Application Priority Data

Aug. 2, 2022 (KR) ........................ 10-2022-0095974

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2310/0267* (2013.01); *G09G 2310/08* (2013.01); *G09G 2330/08* (2013.01)

(58) Field of Classification Search
CPC ................... G09G 3/3266; G09G 3/32; G09G 2310/0267; G09G 2310/08; G09G 2330/08; G09G 2300/0819; G09G 2310/0251; G09G 2310/0286; G09G 3/20; G09G 3/2074; G09G 2310/0202; G09G 2310/0243; G09G 2310/0264; G09G 2310/067; G09G 2320/0233; G09G 2320/0626; G09G 2330/04; G09G 3/3225; G09G 3/3677; G09G 3/3233; G09G 2300/0426; G09G 2300/0809
See application file for complete search history.

(56) References Cited

U.S. PATENT DOCUMENTS

| | | | | |
|---|---|---|---|---|
| 11,056,049 B2 * | 7/2021 | Kim | G09G 3/3233 | |
| 11,270,640 B2 * | 3/2022 | Kim | G09G 3/3266 | |
| 11,705,066 B2 * | 7/2023 | Kang | G09G 3/3233 | 345/211 |
| 12,033,567 B2 * | 7/2024 | Kim | G09G 3/32 | |
| 2003/0179221 A1 * | 9/2003 | Nitta | G09G 3/3648 | 345/690 |
| 2009/0002264 A1 * | 1/2009 | Pai | G09G 3/3666 | 345/3.2 |
| 2009/0174646 A1 * | 7/2009 | Lim | G09G 3/3677 | 345/100 |

(Continued)

FOREIGN PATENT DOCUMENTS

| | | |
|---|---|---|
| KR | 2003-0057062 A | 7/2003 |
| KR | 10-2015-0106372 A | 9/2015 |

*Primary Examiner* — Dorothy Harris
(74) *Attorney, Agent, or Firm* — Birch, Stewart, Kolasch & Birch, LLP

(57) ABSTRACT

According to an aspect of the present disclosure, a display device includes a display panel in which a plurality of sub pixels connected to a plurality of scan lines is defined, a gate driver which supplies a scan signal to the plurality of scan lines, a timing controller which outputs a plurality of start signals to the gate driver, and a start control circuit connected between the timing controller and the gate driver. When at least two start signals, among the plurality of start signals, are a gate turn-on voltage of a pixel transistor to which the scan signal is supplied, the start control circuit stops outputting the plurality of start signals.

14 Claims, 12 Drawing Sheets

(56) References Cited

U.S. PATENT DOCUMENTS

| | | | | |
|---|---|---|---|---|
| 2011/0254818 | A1* | 10/2011 | Fang | G09G 3/3677 345/205 |
| 2012/0169574 | A1* | 7/2012 | Kim | G09G 3/3233 345/76 |
| 2017/0076683 | A1 | 3/2017 | Lee et al. | |
| 2017/0154585 | A1* | 6/2017 | Lee | G09G 3/3677 |
| 2018/0012550 | A1* | 1/2018 | Lim | G09G 3/3225 |
| 2018/0075803 | A1* | 3/2018 | Lee | G09G 3/3266 |
| 2018/0149889 | A1* | 5/2018 | Kim | G09G 3/3266 |
| 2018/0151123 | A1* | 5/2018 | Li | G09G 3/3233 |
| 2018/0197481 | A1* | 7/2018 | Choi | G09G 3/3266 |
| 2020/0135110 | A1* | 4/2020 | Yokoyama | G09G 3/3266 |
| 2020/0135113 | A1* | 4/2020 | Baik | G09G 3/3258 |
| 2021/0183318 | A1* | 6/2021 | Kim | G09G 3/3266 |
| 2021/0366343 | A1* | 11/2021 | Oh | G09G 3/3291 |
| 2021/0375226 | A1* | 12/2021 | Fujihara | G11C 19/28 |
| 2023/0140604 | A1* | 5/2023 | Jeong | G09G 3/3266 345/211 |
| 2023/0395035 | A1* | 12/2023 | Cao | G09G 3/3677 |

* cited by examiner

DISPLAY DEVICE

CROSS-REFERENCE TO RELATED APPLICATIONS

This application claims the priority to Korean Patent Application No. 10-2022-0095974 filed on Aug. 2, 2022 in the Republic of Korea, the entire contents of which are hereby expressly incorporated by reference into the present application.

BACKGROUND

Field

The present disclosure relates to a display device, and more particularly, to a display device which minimizes a burnt defect due to an input timing error of a start signal input to a gate driver.

Discussion of the Related Art

As display devices which are used for a monitor of a computer, a television, or a cellular phone, there are an organic light emitting display (OLED) device which is a self-emitting device and a liquid crystal display (LCD) device which requires a separate light source.

An applicable range of the display device can be diversified and extends to personal digital assistants as well as monitors of computers and televisions. Further, a display device with a large display area and a reduced volume and weight is being studied.

The display device can drive a plurality of sub pixels using a gate driver which supplies a scan signal and a data driver which supplies a data voltage. Among them, the gate driver generates the scan signal based on a start signal from a timing controller to output the scan signal to the sub pixel. However, there can be a limitation in that an output timing of the start signal from the timing controller can be shifted due to an instantaneous error and an abnormal scan signal can be input to a plurality of sub pixels. As a result, a burnt defect may be caused.

SUMMARY OF THE DISCLOSURE

An object to be achieved by the present disclosure is to provide a display device which minimizes or prevents a burnt defect due to an output timing error of a start signal which is transmitted from a timing controller to a gate driver.

Another object to be achieved by the present disclosure is to provide a display device which can control a timing of a start signal input to a gate driver.

Still another object to be achieved by the present disclosure is to provide a display device which can normally drive a gate driver even though a timing error of a start signal output from the timing controller to the gate driver is caused.

Objects of the present disclosure are not limited to the above-mentioned objects, and other objects, which are not mentioned above, can be clearly understood by those skilled in the art from the following descriptions.

In order to achieve the above-described objects, according to an aspect of the present disclosure, a display device includes a display panel in which a plurality of sub pixels connected to a plurality of scan lines is defined; a gate driver which supplies a scan signal to the plurality of scan lines; a timing controller which outputs a plurality of start signals to the gate driver; and a start control circuit which is connected between the timing controller and the gate driver to transmit the start signal to the gate driver, and when at least two start signals, among a plurality of start signals output from the timing controller, are a gate turn-on voltage of a pixel transistor to which the scan signal is supplied, the start control circuit stops outputting the plurality of start signals. Accordingly, according to the present disclosure, two or more scan signals are simultaneously input to each of the plurality of sub pixels to minimize the burnt error caused by simultaneously applying various voltages to the plurality of sub pixels.

In order to achieve the above-described objects, according to another aspect of the present disclosure, a display device includes a display panel in which a plurality of sub pixels connected to a plurality of scan lines is defined; a gate driver which is connected to the plurality of scan lines and includes a first gate driver, a second gate driver, a third gate driver, and a fourth gate driver; a timing controller which outputs a first start signal, a second start signal, a third start signal, and a fourth start signal to the first gate driver, the second gate driver, the third gate driver, and the fourth gate driver, respectively; and a start control circuit which transmits the third start signal and the fourth start signal to the third gate driver and the fourth gate driver, respectively, at different timings. Therefore, according to the present disclosure, the third gate driver and the fourth gate driver are driven at different timings to suppress various voltages having a high potential difference from simultaneously being inputted to the plurality of sub pixels through a pixel transistor which is turned on by the third scan signal and the fourth scan signal. By doing this, short and burnt defect can be minimized.

Other detailed matters of the exemplary embodiments are included in the detailed description and the drawings.

According to the present disclosure, a burnt defect which can occur due to an output timing error of a start signal transmitted from a timing controller to a gate driver can be minimized.

According to the present disclosure, an abnormal start signal output from the timing controller is not transmitted to a gate driver.

According to the present disclosure, even though an output timing error of a start signal from the timing controller may be caused, the gate driver can be normally driven.

According to the present disclosure, a permanent limitation which may be caused in a display device due to a shifted output timing of the start signal from the timing controller can be minimized or eliminated.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
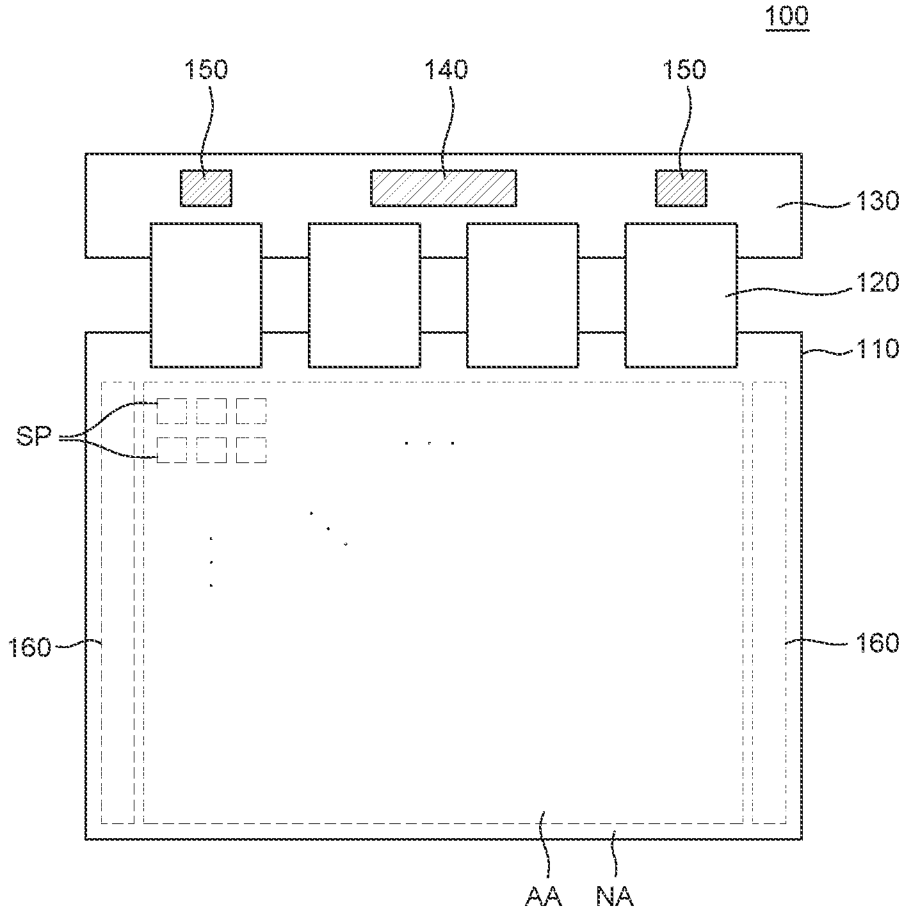
FIG. 1 is a schematic plan view of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "comprising" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components and may not define any order or sequence. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings. All the components of each display device according to all embodiments of the present disclosure are operatively coupled and configured.

FIG. 1 is a schematic plan view of a display device according to an exemplary embodiment of the present disclosure. In FIG. 1, for the convenience of description, among various components of the display device 100, a display panel 110, a flexible film 120, a printed circuit board 130, a timing controller 140, a gate driver 160, and a start control circuit 150 are illustrated.

The display panel 110 is a configuration for displaying images to a user, and a light emitting diode for displaying images, a pixel circuit for driving the light emitting diode, and wiring lines which transmit various signals to the light emitting diode and the pixel circuit can be disposed thereon.

The display panel 110 includes an active area AA and a non-active area NA.

The active area AA is an area where images are displayed in the display panel 110. In the active area AA, a plurality of sub pixels SP which configures a plurality of pixels and a circuit for driving the plurality of sub pixels SP can be disposed. The plurality of sub pixels SP is a minimum unit which configures the active area AA and a plurality of scan lines and a plurality of data lines intersect each other, and each of the plurality of sub pixels SP is connected to the scan lines and the data lines.

The light emitting diode can be disposed in each of the plurality of sub pixels SP. For example, in each of the plurality of sub pixels SP, as a light emitting diode, an organic light emitting diode including an anode, an organic light emitting layer, and a cathode, and a light emitting diode LED including an n-type semiconductor layer, a light emitting layer, and a p-type semiconductor layer can be disposed. However, it is not limited thereto. Further, a circuit for driving light emitting devices of the plurality of sub pixels SP can include a transistor and a capacitor. For example, the pixel circuit can be configured by a pixel transistor and a storage capacitor, but is not limited thereto.

The non-active area NA is an area where no image is displayed. In the non-active area NA, various wiring lines and circuits for driving the light emitting diode of the active area AA are disposed. For example, in the non-active area NA, a link line or a gate driver 160 which is for transmitting signals to the plurality of sub pixels and circuits of the active area AA can be disposed, but the non-display area is not limited thereto.

One or more flexible films 120 are disposed at one end of the display panel 110. For example, one or more flexible films 120 can be disposed depending on the design. Hereinafter, for the convenience of description, even though it is described that a plurality of flexible films 120 is disposed, the number of flexible films 120 can vary depending on the design and is not limited thereto.

The plurality of flexible films 120 can be electrically connected to the non-active area NA of the display panel 110. The plurality of flexible films 120 is films in which various components are disposed on a base film having a malleability to supply a signal to the plurality of sub pixels SP and the driving circuits of the active area AA, and can be electrically connected to the display panel 110. One ends of the plurality of flexible films 120 are disposed in the non-active area NA of the display panel 110 to supply a power voltage or a data voltage to the plurality of sub pixels SP and the driving circuits of the active area AA.

In the meantime, a driving IC (integrated circuit), such as a data driver IC, can be disposed on the plurality of flexible films 120. The driving IC is a component which processes data for displaying images and a driving signal for processing the data. The driving IC can be disposed by a chip on glass (COG), a chip on film (COF), or a tape carrier package (TCP) technique depending on a mounting method. However, for the convenience of description, it is described that the driving IC is mounted on the plurality of flexible films 120 by a chip on film technique, but is not limited thereto. Further, the driving IC can be integrated with the timing controller 140 to be disposed as a single chip.

The printed circuit board 130 is a component which supplies signals to the driving IC. Various components can be disposed in the printed circuit board 130 to supply various signals such as a driving signal or a data signal to the driving IC. In the meantime, even though one printed circuit board 130 is illustrated, the number of printed circuit boards 130 can vary depending on the design and is not limited thereto.

The gate driver 160 is disposed in the non-active area NA of the display panel 110. The gate driver 160 is controlled by a signal provided from the timing controller 140 and supplies a plurality of scan signals to the plurality of scan lines. Even though in FIG. 1 it is illustrated that one gate driver 160 is disposed in the non-active area NA on each of the both sides of the display panel 110, the number of the gate drivers 160 and the placement thereof are not limited thereto.

Even though in FIG. 1 it is illustrated that the gate driver 160 is formed by a gate in panel (GIP) manner to be mounted in the display panel 110, the gate driver 160 can be formed in the other place, not in the display panel 110, but is not limited thereto.

The data driver can be disposed in the flexible film 120. The data driver converts image data input from the timing controller 140 into a data voltage using a reference gamma voltage in accordance with a plurality of data control signals supplied from the timing controller 140. The data driver can supply the converted data voltage to the plurality of data lines.

The timing controller 140 is disposed in the printed circuit board 130. The timing controller 140 aligns image data input from the outside to supply the image data to the data driver. The timing controller 140 can generate a gate control signal and a data control signal using synchronization signals input from the outside, such as start signal, a dot clock signal, a data enable signal, and horizontal/vertical synchronization signals. The timing controller 140 supplies the generated gate control signal and data control signal to the gate driver 160 and the data driver, respectively, to control the gate driver 160 and the data driver.

A start control circuit 150 is disposed in the printed circuit board 130. The start control circuit 150 can control a start signal which is output from the timing controller 140 to the gate driver 160. Specifically, the start control circuit 150 can suppress an output timing error of a start signal which is output from the timing controller 140 to the gate driver 160. For example, among the start signals output from the timing controller 140, only a start signal which is output at a normal timing can be transmitted to the gate driver 160 via the start control circuit 150, and a start signal which is output at an abnormal timing may not be transmitted to the gate driver 160 by the start control circuit 150.

Hereinafter, a plurality of sub pixels SP will be described in more detail with reference to FIGS. 2 and 3. Each of one or more sub pixels SP in the display device of FIG. 1 can have the configuration of FIGS. 2 and 3.

Figure 2:
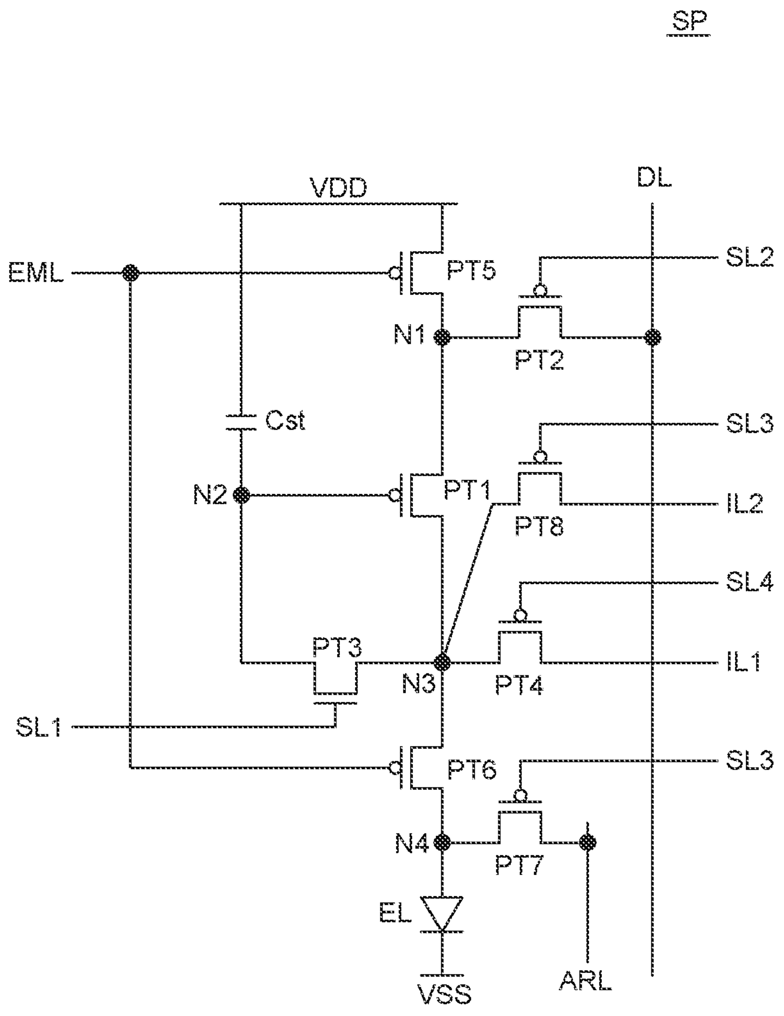
FIG. 2 is a pixel circuit diagram of a sub pixel of a display device according to an exemplary embodiment of the present disclosure.

FIG. 2 is a pixel circuit diagram of a sub pixel of a display device according to an exemplary embodiment of the present disclosure. FIG. 3 is a timing chart illustrating waveforms of signals which are input to a pixel circuit of a display device according to an exemplary embodiment of the present disclosure. A pixel circuit includes a first pixel transistor PT1, a second pixel transistor PT2, a third pixel transistor PT3, a fourth pixel transistor PT4, a fifth pixel transistor PT5, a sixth pixel transistor PT6, a seventh pixel transistor PT7, an eighth pixel transistor PT8, and a storage capacitor Cst.

Each of the plurality of sub pixels SP is electrically connected to a plurality of scan lines, a data line DL, a first initialization line IL1, a second initialization line IL2, an anode reset line ARL, a high potential power line VDD, and a low potential power line VSS. At this time, the plurality of scan lines includes a first scan line SL1, a second scan line SL2, a third scan line SL3, and a fourth scan line SL4.

First, each of the plurality of sub pixel SP includes a plurality of pixel transistors. The plurality of transistors can be formed by different types of transistors from each other. For example, one pixel transistor among the plurality of pixel transistors can be a pixel transistor having an oxide semiconductor as an active layer. The oxide semiconductor material has a low off-current so that the oxide semiconductor material is appropriate for a switching transistor which maintains a short turn-on time and a long turn-off time.

For example, the other pixel transistor, among the plurality of pixel transistors, can be a pixel transistor having low temperature poly-silicon (LTPS) as an active layer. The poly-silicon material has a high mobility to have a low power consumption and excellent reliability so that it can be appropriate for the driving transistor.

In the meantime, the plurality of pixel transistors can be n-type transistors or p-type transistors. In the n-type transistor, carriers are electrons so that electrons can flow from a source electrode to a drain electrode, and currents can flow from the drain electrode to the source electrode. In the p-type transistor, carriers are holes so that holes can flow from a source electrode to a drain electrode, and currents can flow from the source electrode to the drain electrode. For example, one of the plurality of pixel transistors can be an n-type transistor, and the other one of the plurality of pixel transistors can be a p-type transistor.

For example, the third pixel transistor PT3 can be an n-type transistor and has the oxide semiconductor as an active layer. The first pixel transistor PT1, the second pixel transistor PT2, the fourth pixel transistor PT4, the fifth pixel transistor PT5, the sixth pixel transistor PT6, the seventh pixel transistor PT7, and the eighth pixel transistor PT8 can be p-type transistors and have low-temperature polysilicon as an active layer. However, the material which forms the active layers of the plurality of pixel transistors and a type of the plurality of pixel transistors are illustrative, but are not limited thereto.

First, the first pixel transistor PT1, the fifth pixel transistor PT5, the sixth pixel transistor PT6, and a light emitting diode EL can be connected in parallel between the high potential power line VDD and the low potential power line VSS.

The first pixel transistor PT1 includes a gate electrode connected to the second node N2, a source electrode connected to the first node N1, and a drain electrode connected to the third node N3. A driving current applied to the light emitting diode EL can be controlled using the first pixel transistor PT1. Accordingly, the first pixel transistor PT1 can be referred to as a driving transistor.

The fifth pixel transistor PT5 includes a gate electrode connected to an emission control signal line EML, a source electrode connected to a high potential power line VDD, and a drain electrode connected to the first node N1. The fifth pixel transistor PT5 can transmit a high potential power voltage to the first node N1 in response to an emission control signal EM applied to the emission control signal line EML.

The sixth pixel transistor PT6 includes a gate electrode connected to an emission control signal line EML, a source electrode connected to the third node N3, and a drain electrode connected to the fourth node N4. The sixth pixel transistor PT6 can form a current path between the third node N3 and the fourth node N4 in response to the emission control signal EM applied to the emission control signal line EML. In this case, the gate electrodes of the fifth pixel transistor PT5 and the sixth pixel transistor PT6 are connected to the same emission control signal line EML so that the fifth pixel transistor PT5 and the sixth pixel transistor PT6 can be simultaneously turned on or turned off.

The light emitting diode EL includes an anode and a cathode. The anode is connected to the fourth node N4 and the cathode is connected to the low potential power line VSS. The light emitting diode EL can be supplied with the driving current controlled by the first pixel transistor PT1 which is a driving transistor to emit light.

The storage capacitor Cst is disposed between the high potential power line VDD and the second node N2. The storage capacitor Cst can include a capacitor electrode connected to the high potential power line VDD and a capacitor electrode which is connected to the gate electrode of the first pixel transistor PT1 through the second node N2. The storage capacitor Cst in which a predetermined voltage is stored can maintain a voltage level of the gate electrode of the first pixel transistor PT1 to be constant during an emission period so that a constant driving current is supplied to the light emitting diode EL.

The second pixel transistor PT2 includes a gate electrode connected to the second scan line SL2, a source electrode connected to the data line DL, and a drain electrode connected to the first node N1. When the second pixel transistor PT2 is turned on in response to the second scan signal SCAN2 applied to the second scan line SL2, a data voltage can be transmitted from the data line DL to the first node N1.

The third pixel transistor PT3 includes a gate electrode connected to the first scan line SL1, a source electrode connected to the second node N2, and a drain electrode connected to the third node N3. The third pixel transistor PT3 can short the gate electrode and the drain electrode of the first pixel transistor PT1, and form a diode-connection with the first pixel transistor PT1. According to the diode connection, the gate electrode and the drain electrode are shorted so that the first pixel transistor PT1 operates as a diode. At this time, the third pixel transistor PT3 is implemented by an oxide semiconductor pixel transistor with a low off-current so that the leakage of the current from the gate electrode of the first pixel transistor PT1 can be minimized and the flicker can be reduced.

The fourth pixel transistor PT4 includes a gate electrode connected to the fourth scan line SL4, a source electrode connected to the first initialization line IL1 and a drain electrode connected to the third node N3. When the fourth pixel transistor PT4 is turned on in response to the fourth scan signal SCAN4 applied to the fourth scan line SL4, a first initialization voltage can be transmitted to the third node N3.

The seventh pixel transistor PT7 includes a gate electrode connected to the third scan line SL3, a source electrode connected to the fourth node N4, and a drain electrode connected to an anode reset line ARL. When the seventh pixel transistor PT7 is turned on in response to the third scan signal SCAN3 applied to the third scan line SL3, an anode reset voltage can be transmitted to the fourth node N4 which is an anode of the light emitting diode EL.

The eighth pixel transistor PT8 includes a gate electrode connected to the third scan line SL3, a source electrode connected to the second initialization line IL2, and a drain electrode connected to the third node N3. When the eighth pixel transistor PT8 is turned on in response to the third scan signal SCAN3 applied to the third scan line SL3, a second initialization voltage can be transmitted to the third node N3.

Figure 3:
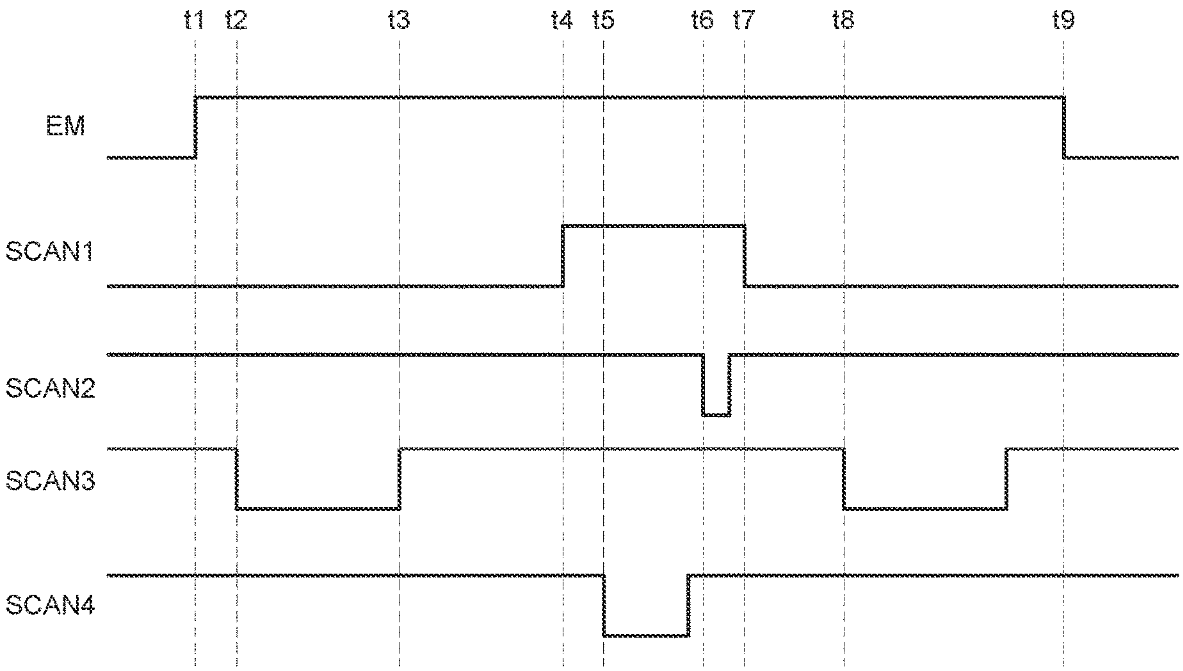
FIG. 3 is a timing chart illustrating waveforms of signals which are input to a pixel circuit of a display device according to an exemplary embodiment of the present disclosure.

Referring to FIG. 3, a high level of emission control signal EM is applied to the emission control signal line EML from a first time t1 to a ninth time t9. The fifth pixel transistor PT5 and the sixth pixel transistor PT6 can maintain a turned-off state while a high level of emission control signal EM is applied.

A low level of third scan signal SCAN3 is applied to the third scan line SL3 from a second time t2 to a third time t3. When a low level of third scan signal SCAN3 is applied, the seventh pixel transistor PT7 and the eighth pixel transistor PT8 which are p-type transistors can be turned on.

An anode reset voltage of the anode reset line ARL is transmitted to the fourth node N4 through the turned-on seventh pixel transistor PT7 from the second time t2 to the third time t3. That is, the anode of the light emitting diode EL can be initialized to an anode reset voltage.

The second initialization voltage is applied to the third node N3 which is a drain electrode of the first pixel transistor PT1 from the second initialization line IL2 through the turned on eighth pixel transistor PT8 from the second time t2 to the third time t3. Before applying the data voltage to the sub pixel SP, an on-bias stress can be applied to the first pixel transistor PT1 which is a driving pixel transistor.

A hysteresis of the plurality of pixel transistors can be alleviated by applying the on-bias stress. First, the plurality of pixel transistors can have a hysteresis in which a threshold voltage varies in accordance with an operation state in a previous frame. For example, even though the same voltage level of data voltage is supplied to the first pixel transistor PT1, the threshold voltage of the first pixel transistor PT1 varies in accordance with an operation state in a previous frame so that different levels of driving currents can be generated from each other. Accordingly, an on-bias stress is applied to the plurality of pixel transistors to initialize a characteristic of the plurality of pixel transistors, that is, the threshold voltage to a predetermined state. For example, the on-bias stress is applied on each of the plurality of sub pixels SP to initialize a specific pixel transistor of each of the plurality of sub pixels SP to the same state and to minimize a luminance deviation of the plurality of sub pixels SP in a subsequent frame.

Next, a high level of first scan signal SCAN1 is applied to the first scan line SL1 from the fourth time t4 to the seventh time t7. Therefore, the n-type third pixel transistor PT3 is turned on to form diode connection with the gate electrode and the drain electrode of the first pixel transistor PT1 from the fourth time t4 to the seventh time t7.

At the fifth time t5, a low level of fourth scan signal SCAN4 is applied to the fourth scan line SL4. The fourth pixel transistor PT4 can be turned on by the fourth scan signal SCAN4, and the first initialization voltage from the first initialization line IL1 can be transmitted to the third node N3 through the turned-on fourth pixel transistor PT4. The first initialization voltage can be transmitted from the drain electrode to the gate electrode of the first pixel transistor PT1 through the turned-on third pixel transistor PT3. Accordingly, a voltage of the gate electrode of the first pixel transistor PT1 can be initialized to the first initialization voltage at the fifth time t5.

Next, at the sixth time t6, a low level of second scan signal SCAN2 is applied to the second scan line SL2. The second pixel transistor PT2 can be turned on by the second scan signal SCAN2, and the data voltage from the data line DL can be transmitted to the first node N1 through the turned-on second pixel transistor PT2. At this time, the first pixel transistor PT1 is diode-connected by the turned-on third pixel transistor PT3, and a current can flow between the source electrode and the drain electrode of the first pixel transistor PT1. When the current flows from the source electrode of the first pixel transistor PT1 to the drain electrode by the data voltage transmitted to the first node N1, a voltage of the second node N2 to which the gate electrode of the first pixel transistor PT1 is connected can continuously rise. Accordingly, while the second pixel transistor PT2 is turned on, a voltage of the second node N2 can be increased to a value obtained by subtracting a threshold voltage of the first pixel transistor PT1 from the data voltage, and the threshold voltage of the first pixel transistor PT1 can be sampled.

A specific voltage can be also stored in the storage capacitor Cst connected to the gate electrode of the first pixel transistor PT1. A voltage difference applied to both ends of the storage capacitor Cst can be stored in the storage capacitor. For example, a high potential power voltage and a voltage of a gate electrode of the first pixel transistor PT1 are applied to both ends of the storage capacitor Cst so that a voltage obtained by subtracting a difference of a data voltage and a threshold voltage of the first pixel transistor PT1 from the high potential power voltage can be stored in the capacitor Cst. That is, in the storage capacitor Cst, a voltage of "high potential voltage—(data voltage—threshold voltage)" can be stored. Therefore, a period in which the second scan signal SCAN2 is applied to a low level can be referred to as a sampling period and a programing period.

Next, the first scan signal SCAN1 becomes a low level from the seventh time t7 so that the third pixel transistor PT3 can be turned off.

Next, at the eighth time t8, a low level of the third scan signal SCAN3 is applied to the third scan line SL3. Therefore, similar to the period between the second time t2 and the third time t3, the seventh pixel transistor PT7 and the eighth pixel transistor PT8 can be turned on. Accordingly, an anode reset voltage of the anode reset line ARL is applied to the fourth node N4 through the turned-on seventh pixel transistor PT7 so that the voltage of the anode of the light emitting diode EL can be initialized to an anode reset voltage. The second initialization voltage is applied from the second initialization line IL2 to the third node N3 which is the drain electrode of the first pixel transistor PT1 through the turned-on eighth pixel transistor PT8 to apply an on-bias stress to the first pixel transistor PT1.

Next, at a ninth time t9, a low level of an emission control signal EM is output from the emission control signal line EML. The fifth pixel transistor PT5 and the sixth pixel transistor PT6 can be turned on from the ninth time t9, and a driving current is supplied to the light emitting diode EL to emit light.

In the meantime, the voltage of the first node N1 which is the source electrode of the first pixel transistor PT1 can rise to the high potential power voltage through the turned-on fifth pixel transistor PT5 at the ninth time t9. At this time, a driving current which flows through the first pixel transistor PT1 can be proportional to a voltage obtained by subtracting a threshold voltage from the voltage between the source electrode and the gate electrode of the first pixel transistor PT1. For example, a voltage of the source electrode is a high potential power voltage and a voltage of the gate electrode can be a difference voltage between the data voltage sampled at the sixth time t6 and the threshold voltage. Finally, the voltage obtained by subtracting the threshold voltage from the voltage between the source electrode and the gate electrode of the first pixel transistor PT1 can be a voltage obtained by subtracting the data voltage from the high potential power voltage.

Accordingly, a driving current which flows through the first pixel transistor PT1 may not be affected by a threshold voltage of the first pixel transistor PT1, but can be determined by the high potential power voltage and the data voltage. That is, a driving current which flows to the light emitting diode EL through the first pixel transistor PT1 can be constant at all times regardless of the fluctuation of the threshold voltage of the first pixel transistor PT1 and constantly maintain a luminance of the display device 100. Therefore, a period from the ninth time t9 can also be referred to as an emission period.

The gate driver 160 which supplies a scan signal to the sub pixel SP can be controlled by the timing controller 140. For example, the gate driver 160 includes a first gate driver, a second gate driver, a third gate driver, and a fourth gate driver. The first gate driver supplies a first scan signal SCAN1 to the first scan line SL1, the second gate driver supplies a second scan signal SCAN2 to the second scan line SL2, the third gate driver supplies a third scan signal SCAN3 to the third scan line SL3, and the fourth gate driver supplies a fourth scan signal SCAN4 to the fourth scan line SL4. Each of the first gate driver, the second gate driver, the third gate driver, and the fourth gate driver receives a start signal from the timing controller 140 to begin the generation of the scan signal. Therefore, in accordance with the output timing of the start signal, the output timings of the first scan signal SCAN1, the second scan signal SCAN2, the third scan signal SCAN3, and the fourth scan signal SCAN4 can be determined.

However, when the timing controller 140 outputs the start signal, if a timing error occurs, a timing error at which the scan signal output from the gate driver 160 is output to the sub pixel SP also occurs so that the pixel circuit can erroneously operate. For example, the low level of third scan signal SCAN3 from the third gate driver and the low level of fourth scan signal SCAN4 from the fourth gate driver need to be output to the sub pixel SP at different timings from each other. However, due to the timing error of the start signal, the low level of third scan signal SCAN3 and the low level of fourth scan signal SCAN4 can be simultaneously input to the sub pixel SP in some cases.

In this case, the fourth pixel transistor PT4, the seventh pixel transistor PT7, and the eighth pixel transistor PT8 are simultaneously turned on to supply the first initialization voltage, the second initialization voltage, and the anode reset voltage to the sub pixel SP at one time. At this time, the short and the burnt defect can be generated due to the high potential difference between the first initialization voltage, the second initialization voltage, and the anode reset voltage. The second initialization voltage can have a high potential difference from the first initialization voltage and the anode reset voltage. For example, the first initialization voltage is approximately −5 V, the second initialization voltage is approximately 6 V, and the anode reset voltage can be approximately −11 V. A potential difference of the second initialization voltage and the first initialization voltage is approximately 11 V, and a potential difference of the second initialization voltage and the anode reset voltage can be approximately 17 V. Due to such a high potential difference, an abnormal current flows in the sub pixel SP and the first initialization line IL1 and the anode reset line ARL connected to the sub pixel SP. Further, a burnt defect can occur in a transistor connected to the first initialization line IL1, the second initialization line IL2, and the anode reset line ARL, for example, a pixel transistor or an anti-static transistor.

Accordingly, in the display device 100 according to the exemplary embodiment of the present disclosure, in order to suppress the start signal output from the timing controller 140 at an abnormal timing from being supplied to the gate driver 160, a start control circuit 150 can be disposed between the timing controller 140 and the gate driver 160.

Hereinafter, the gate driver 160 of the display device 100 according to the exemplary embodiment of the present disclosure will be described in detail with reference to FIGS. 4 to 8. Thereafter, the start control circuit 150 of the display device 100 according to the exemplary embodiment of the present disclosure will be described in detail with reference to FIGS. 9 and 10.

Figure 4:
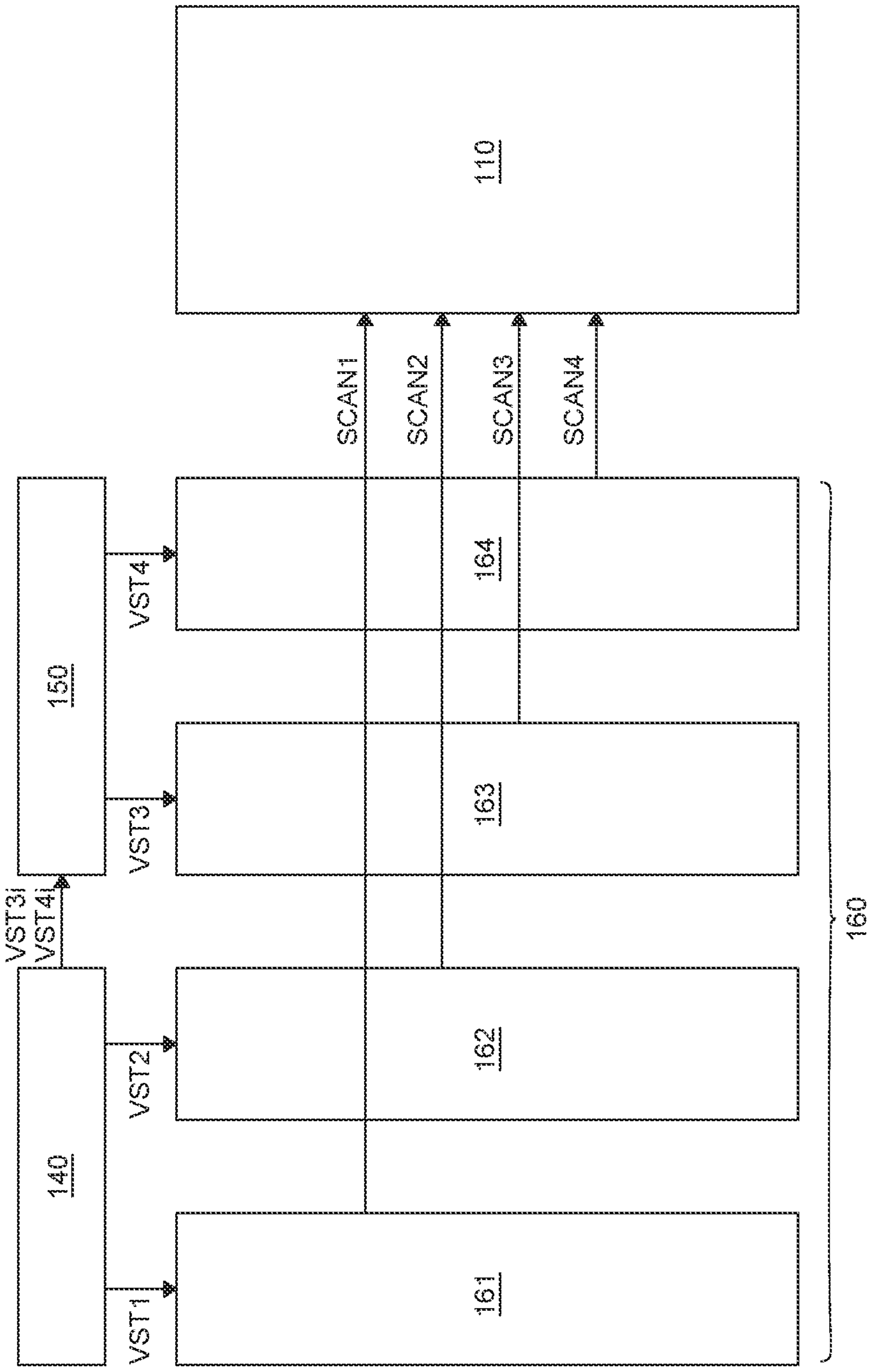
FIG. 4 is a schematic diagram of a display device according to an exemplary embodiment of the present disclosure.
Figure 5:
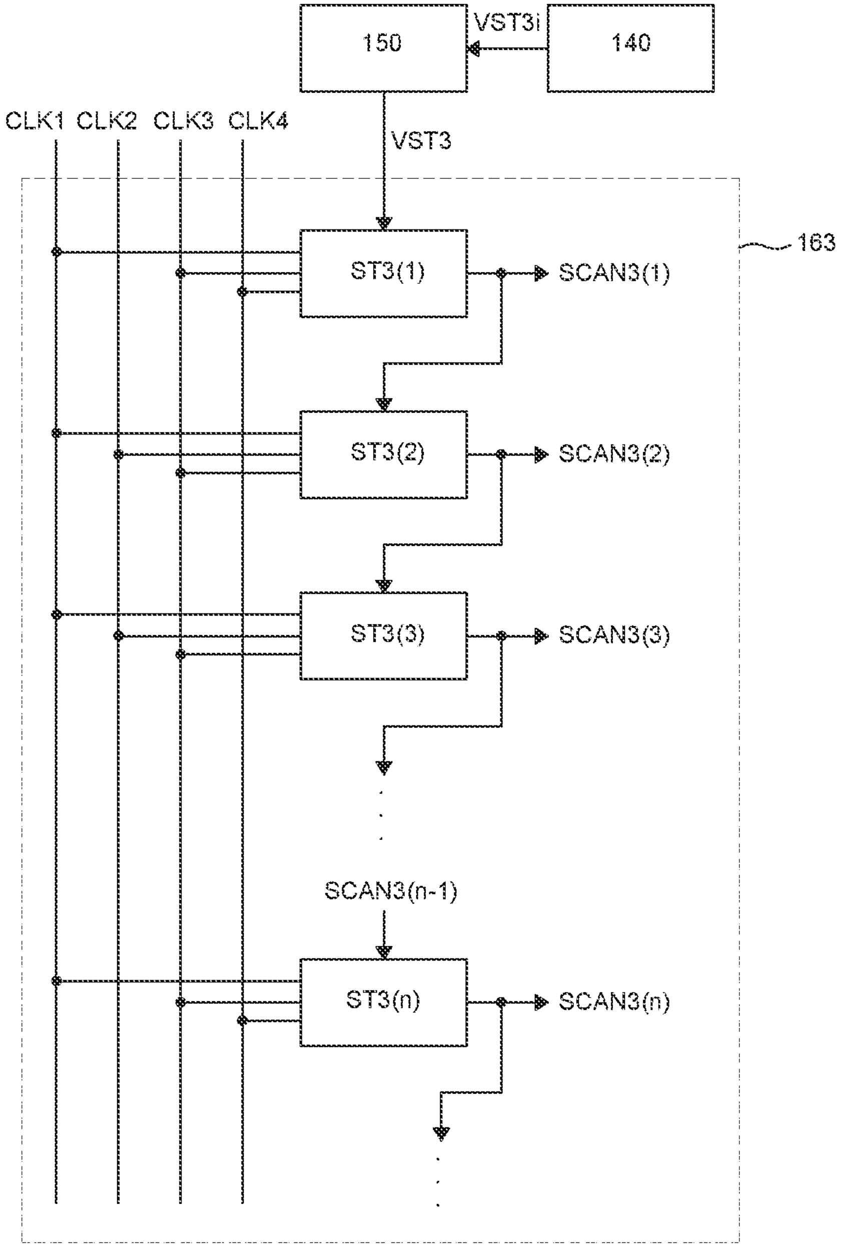
FIG. 5 is a diagram of a third gate driver of a display device according to an exemplary embodiment of the present disclosure.
Figure 6:
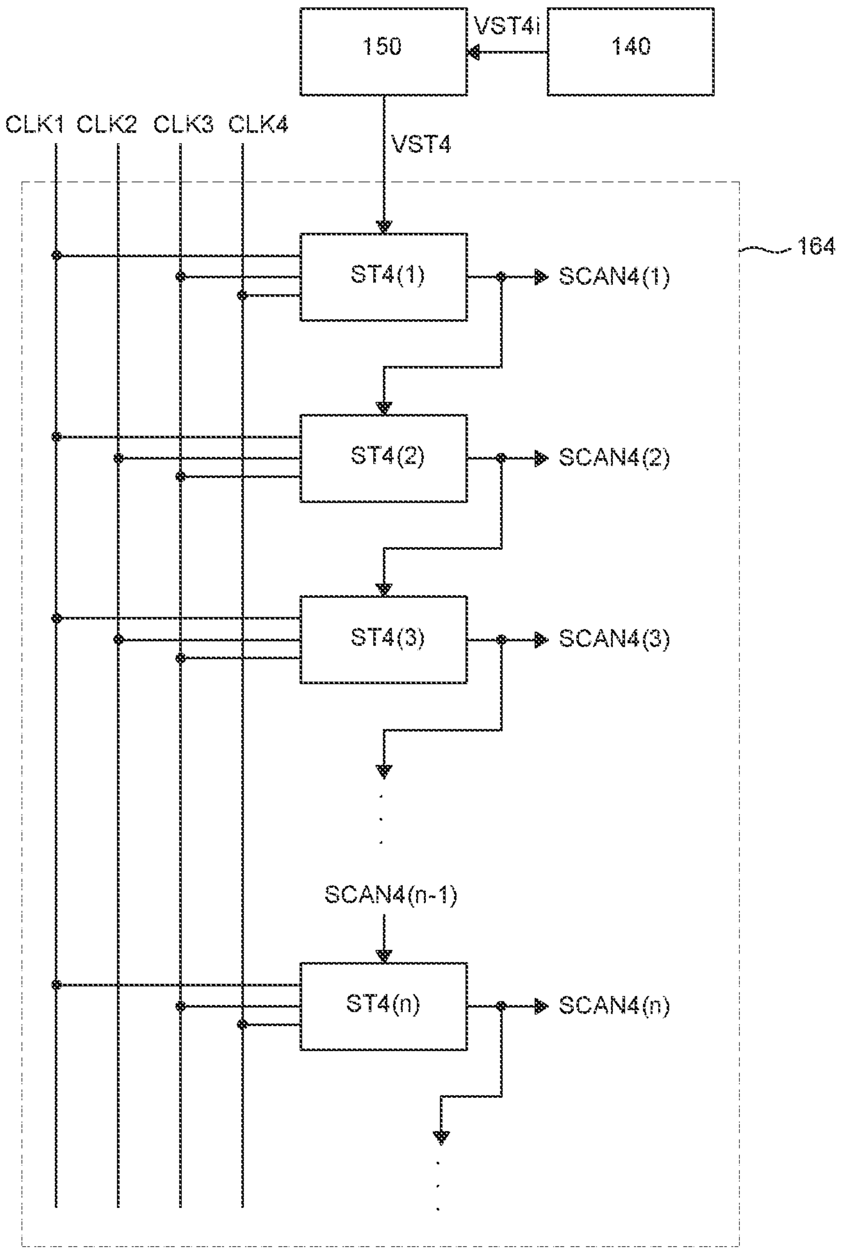
FIG. 6 is a diagram of a fourth gate driver of a display device according to an exemplary embodiment of the present disclosure.
Figure 7:
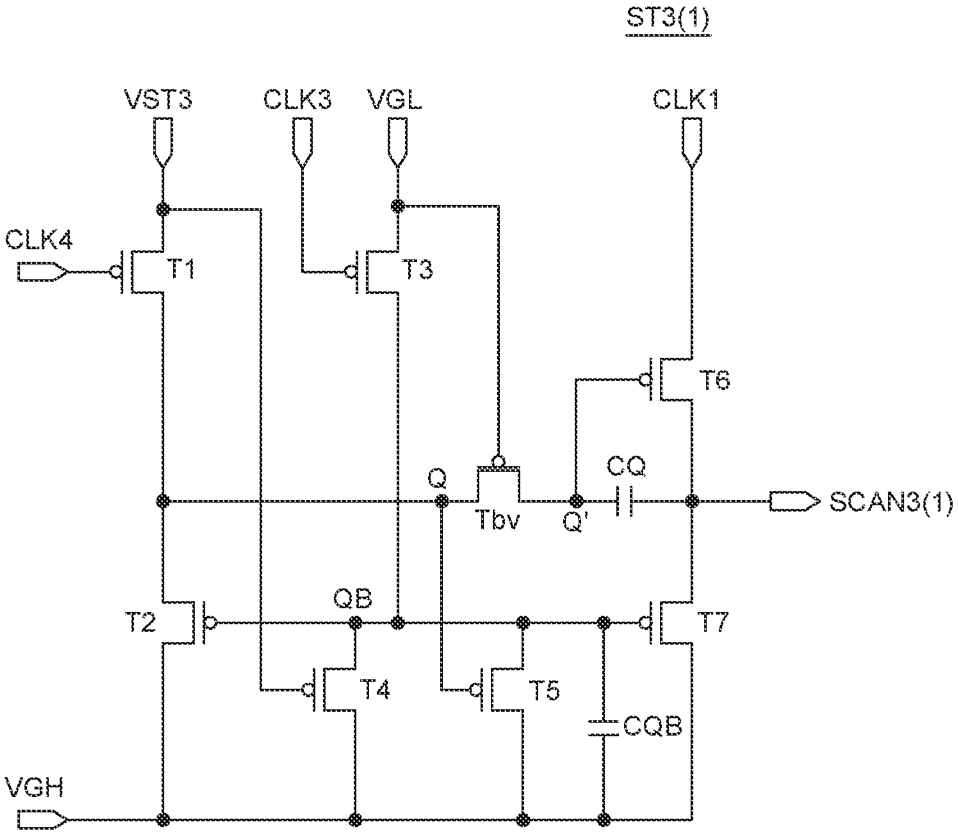
FIG. 7 is a circuit diagram of a 3-1-th stage of a third gate driver of a display device according to an exemplary embodiment of the present disclosure.
Figure 8:
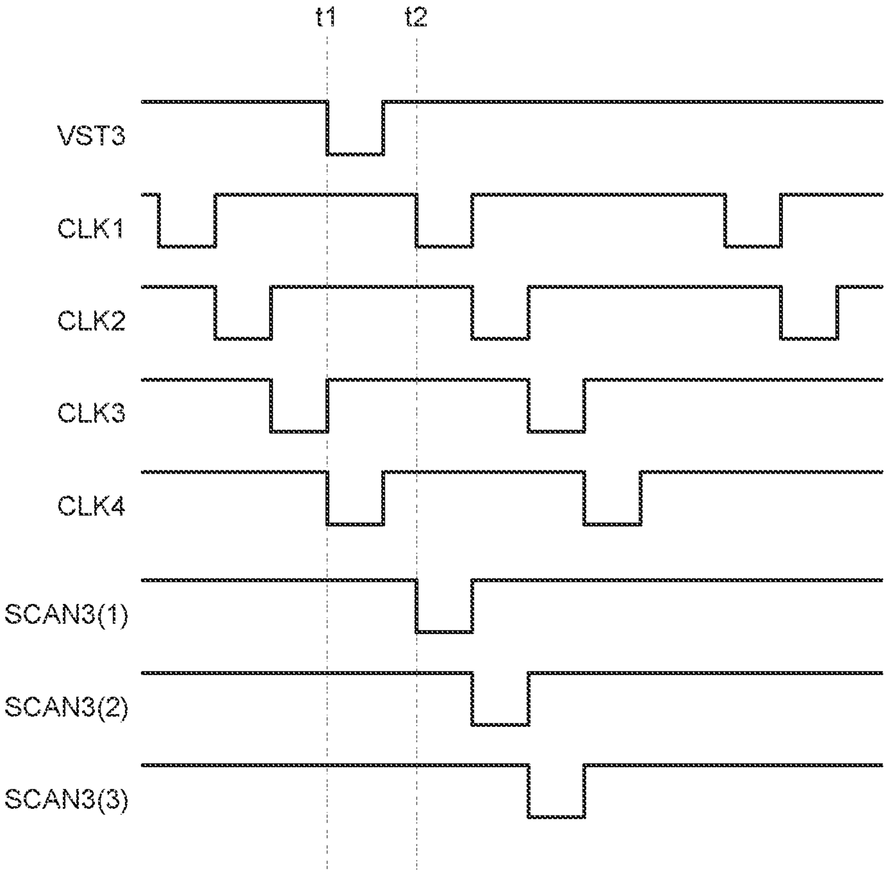
FIG. 8 is a timing chart illustrating waveforms of signals which are input to a third gate driver of a display device according to an exemplary embodiment of the present disclosure.

FIG. 4 is a schematic diagram of a display device according to an exemplary embodiment of the present disclosure. FIG. 5 is a configuration diagram of a third gate driver of a display device according to an exemplary embodiment of the present disclosure. FIG. 6 is a configuration diagram of a fourth gate driver of a display device according to an exemplary embodiment of the present disclosure. FIG. 7 is a circuit diagram of a 3-1-th stage of a third gate driver of a display device according to an exemplary embodiment of the present disclosure. FIG. 8 is a timing chart illustrating waveforms of signals which are input to a third gate driver of a display device according to an exemplary embodiment of the present disclosure. In FIG. 4, only the display panel 110, the timing controller 140, the start control circuit 150, and the gate driver 160 are illustrated.

Referring to FIG. 4, the gate driver 160 includes a first gate driver 161, a second gate driver 162, a third gate driver 163, and a fourth gate driver 164. The first gate driver 161 generates a first scan signal SCAN1, the second gate driver 162 generates a second scan signal SCAN2, the third gate driver 163 generates a third scan signal SCAN3, and the fourth gate driver 164 can generate a fourth scan signal SCAN4.

Similar to FIG. 1, the first gate driver 161, the second gate driver 162, the third gate driver 163, and the fourth gate driver 164 of FIG. 4 can be disposed in both the non-active areas NA on both sides of the active area AA or disposed in any one of the non-active areas on both sides of the active area AA. For example, all the first gate driver 161, the second gate driver 162, the third gate driver 163, and the fourth gate driver 164 can be disposed in both the non-active area NA on one side of the active area AA and the non-active area NA on the other side to supply the scan signal from both sides of the scan line. In another example, any one of the first gate driver 161, the second gate driver 162, the third gate driver 163, and the fourth gate driver 164 can be disposed in the non-active area NA on one side of the active area AA, and the others of the first to fourth gate drivers 161-164 can be disposed in the non-active area NA on the other side to supply the scan signal to the scan line in only one direction.

Each of the first gate driver 161, the second gate driver 162, the third gate driver 163, and the fourth gate driver 164 can be driven by a start signal which is directly transmitted from the timing controller 140 or a start signal which is transmitted from the timing controller 140 and the start control circuit 150. The start signal includes a first start signal VST1, a second start signal VST2, a third start signal VST3, and a fourth start signal VST4. For example, the first gate driver 161 can generate the first scan signal SCAN1 based on the first start signal VST1 from the timing controller 140, and the second gate driver 162 can generate the second scan signal SCAN2 based on the second start signal VST2 from the timing controller 140. The third gate driver 163 can generate the third scan signal SCAN3 based on the third start signal VST3 output via the timing controller 140 and the start control circuit 150. The fourth gate driver 164 can generate the fourth scan signal SCAN4 based on the fourth start signal VST4 output via the start control circuit 150 from the timing controller 140. An initial third start signal VST3*i* output from the timing controller 140 is input to the start control circuit 150. If the initial third start signal VST3*i* is a signal output at a normal timing, the start control circuit 150 can output the initial third start signal VST3*i* as the third start signal VST3. An initial fourth start signal VST4*i* output from the timing controller 140 is input to the start control circuit 150. If the initial fourth start signal VST4*i* is a signal output at a normal timing, the start control circuit 150 can output the initial fourth start signal VST4*i* as the fourth start signal VST4.

In the meantime, for the convenience of description, in FIG. 4, a start signal output from the timing controller 140 to the start control circuit 150 is referred to as an initial third start signal VST3*i*, and a start signal output from the start control circuit 150 to the third gate driver 163 is referred to as the third start signal VST3 to be distinguished. However, the initial third start signal VST3*i* and the third start signal VST3 are substantially the same signal. Further, a start signal output from the timing controller 140 to the start control circuit 150 is referred to as an initial fourth start signal VST4*i*, and a start signal output from the start control circuit 150 to the fourth gate driver 164 is referred to as the fourth start signal VST4 to be distinguished. However, the initial fourth start signal VST4*i* and the fourth start signal VST4 are substantially the same signal.

Referring to FIGS. 5 and 6, each of the first gate driver 161, the second gate driver 162, the third gate driver 163, and the fourth gate driver 164 includes a plurality of stages which is dependently connected to sequentially output a scan signal. Each of the plurality of stages receives a start signal or an output of a previous stage to output the scan signal to a corresponding scan line. A first stage of the gate driver 160 can start to output the scan signal based on the start signal and subsequent stages thereof can output the scan signal based on a scan signal output from the previous stage.

For example, referring to FIG. 5, the third gate driver 163 can be configured by a plurality of stages including a 3-1-th stage ST3(1), a 3-2-th stage ST3(2), a 3-3-th stage ST3(3), and a 3-n-th stage ST3(*n*). The 3-1-th stage ST3(1) at the top can output the third scan signal SCAN3(1) to a third scan line SL3 of a first row based on the third start signal VST3 output from the timing controller 140 and the start control circuit 150. The 3-2-th stage ST3(2) can output the third scan signal SCAN3(2) to the third scan line SL3 of a second row based on the third scan signal SCAN3(1) output from the 3-1-th stage ST3(1) which is a previous stage. The 3-3-th stage ST3(3) can also output the third scan signal SCAN3(3) to the third scan line SL3 of a third row based on the third scan signal SCAN3(2) output from the 3-2-th stage ST3(2) which is a previous stage. The 3-n-th stage ST3(*n*) can output the third scan signal SCAN3(*n*) to the third scan line SL3 of an n-th row based on the third scan signal SCAN3 (*n*−1) output from the previous stage. Accordingly, the output timing of the third scan signal SCAN3 of the plurality of stages of the third gate driver 163 can be determined by a third start signal VST3 which is initially input to the third gate driver 163.

For example, referring to FIG. 6, the fourth gate driver 164 also includes a plurality of stages which is dependently connected, similarly to the third gate driver 163. The 4-1-th stage ST4(1) at the top can output the fourth scan signal SCAN4(1) to a fourth scan line SL4 of a first row based on the fourth start signal VST4 output from the timing controller 140 and the start control circuit 150. The 4-2-th stage ST4(2) receives the fourth scan signal SCAN4(1) output from the 4-1-th stage ST4(1) which is a previous stage to output the fourth scan signal SCAN4(2) to the fourth scan line SL4 of a second row. The 4-3-th stage ST4(3) and the 4-n-th stage ST4(*n*) also generate the fourth scan signals SCAN4(3) and the SCAN4(*n*) based on the fourth scan signals SCAN4(2) and SCAN4(*n*−1), respectively. Accordingly, the output timing of the fourth scan signal SCAN4 of the plurality of stages of the fourth gate driver 164 can be determined by a fourth start signal VST4 which is initially input to the fourth gate driver 164.

Hereinafter, a process of generating a scan signal in each of the plurality of stages will be described in more detail with reference to FIGS. 7 and 8.

Referring to FIG. 7, each of a plurality of stages of the third gate driver 163 includes a plurality of transistors and a capacitor to generate a third scan signal SCAN3 based on a plurality of clock signals, a gate low voltage VGL, and a gate high voltage VGH, and a third start signal VST3 or a third scan signal SCAN3 of a previous stage.

Specifically, a 3-1-th stage ST3(1) of the third gate driver 163 includes a first transistor T1, a second transistor T2, a third transistor T3, a fourth transistor T4, a fifth transistor T5, a sixth transistor T6, a seventh transistor T7, a bridge transistor Tbv, a first capacitor CQ, and a second capacitor CQB.

The first transistor T1 includes a gate electrode connected to a fourth clock signal line, among a plurality of clock signal lines, a source electrode and a drain electrode connected between the start control circuit 150 from which the third start signal VST3 is output and the Q node. The first transistor T1 is turned on by the fourth clock signal CLK4 to transmit the third start signal VST3 to the Q node.

The second transistor T2 includes a gate electrode connected to the QB node, and a source electrode and a drain electrode connected between a gate high line and a Q node. The second transistor T2 is turned on by a voltage of the QB node to transmit the gate high voltage VGH to the Q node.

The third transistor T3 includes a gate electrode connected to a third clock signal line, among the plurality of clock signal lines, and a source electrode and a drain electrode connected between the gate low line and the QB node. The third transistor T3 is turned on by the third clock signal CLK3 to transmit the gate low voltage VGL to the QB node.

The fourth transistor T4 includes a gate electrode connected to the start control circuit 150 from which the third start signal VST3 is output, and a source electrode and a drain electrode connected between the gate high line and the QB node. The fourth transistor T4 is turned on by the third start signal VST3 from the start control circuit 150 to transmit the gate high voltage VGH to the QB node.

The fifth transistor T5 includes a gate electrode connected to the Q node, and a source electrode and a drain electrode connected between the gate high line and the QB node. The fifth transistor T5 is turned on by a voltage of the Q node to transmit the gate high voltage VGH to the QB node.

The sixth transistor T6 includes a gate electrode connected to a Q' node, and a source electrode and a drain electrode connected between a first clock signal line, among a plurality of clock signal lines, and an output end. The sixth transistor T6 is turned on by a voltage of the Q' node to output the first clock signal CLK1 to an output end. That is, the first clock signal CLK1 serves as a third scan signal SCAN3 to be output to the third scan line SL3. Accordingly, when a low level voltage is applied to the Q' node, the sixth transistor T6 can output the first clock signal CLK1 as the third scan signal SCAN3.

The seventh transistor T7 includes a gate electrode connected to the QB node, and a source electrode and a drain electrode connected between the gate high line and the output end. The seventh transistor T7 is turned on by a voltage of the QB node to transmit the gate high voltage VGH to the output end.

The bridge transistor Tbv includes a gate electrode connected to the gate low line, and a source electrode and a drain electrode connected between the Q node and the Q' node. The gate electrode of the bridge transistor Tbv is connected to the gate low line so that a turned-on state is maintained at all times to electrically connect the Q node and the Q' node and transmit the voltage of the Q node to the Q' node. The bridge transistor Tbv can suppress the leakage of the voltage of the Q' node to the Q node. The bridge transistor Tbv always maintains the turned-on state at all times so that the above-described sixth transistor T6 is turned on by a voltage of the Q node to output the first clock signal CLK1 to the output end.

The first capacitor CQ includes a capacitor electrode connected to the Q' node and a capacitor electrode connected to the output end. The first capacitor CQ can store a voltage of the Q' node.

The second capacitor CQB includes a capacitor electrode connected to the QB node and a capacitor electrode connected to the gate high line. The second capacitor CQB can store a voltage of the QB node.

Referring to FIGS. 7 and 8 together, low level of a third start signal VST3 and fourth clock signal CLK4 are input to the 3-1-th stage ST3(1) at the first time t1.

The first transistor T1 is turned on by the fourth clock signal CLK4 to transmit a low level of third start signal VST3 to the Q node. The low level of third start signal VST3 can be also transmitted to the Q' node through the bridge transistor Tbv. Therefore, a voltage of the third start signal VST3 can be charged in the first capacitor CQ whose one end is connected to the Q' node.

The fourth transistor T4 is turned on by the low level of third start signal VST3 to transmit the gate high voltage VGH to the QB node, and the second transistor T2 and the seventh transistor T7 whose gate electrodes are connected to the QB node can be turned off.

Next, a low level of first clock signal CLK1 is input to the 3-1-th stage ST3(1) at a second time t2.

The sixth transistor T6 can maintain the turned-on state based on a voltage of a low level of third start signal VST3 stored in the first capacitor CQ at the second time t2 and transmit the first clock signal CLK1 to the output end. Therefore, the low level of first clock signal CLK1 is output as a third scan signal SCAN3 through the turned-on sixth transistor T6.

Accordingly, the 3-1-th stage ST3(1) of the third gate driver 163 can output the third scan signal SCAN3 based on the third start signal VST3. The third scan signal SCAN3 output from the 3-1-th stage ST3(1) is output to the next stage and each of the plurality of stages receives an output of a previous stage to sequentially output the third scan signal SCAN3.

In the meantime, even though in FIGS. 5 and 6, a plurality of stages of the third gate driver 163 and the fourth gate driver 164 is illustrated, the first gate driver 161 and the second gate driver 162 also operate by the start signal, like the third gate driver 163 and the fourth gate driver 164 and can be configured by a plurality of stages which is dependently connected.

Further, the circuit of the 3-1-th stage ST3(1) illustrated in FIG. 7 is illustrative so that the stage of each of the first gate driver 161, the second gate driver 162, and the fourth gate driver 164 can also include the same circuit as the circuit of FIG. 7 and can also include another circuit, but is not limited thereto.

Hereinafter, a start control circuit 150 of the display device 100 according to the exemplary embodiment of the present disclosure will be described in detail with reference to FIGS. 9 and 10.

Figure 9:
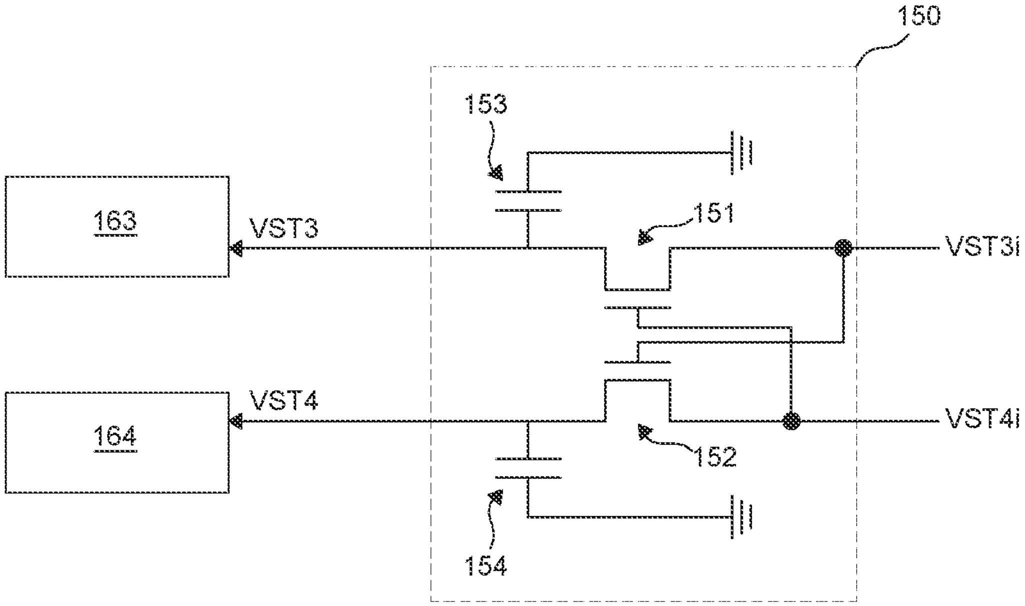
FIG. 9 is a circuit diagram of a start control circuit of a display device according to an exemplary embodiment of the present disclosure.

FIG. 9 is a circuit diagram of a start control circuit of a display device according to an exemplary embodiment of the present disclosure. FIG. 10 is a timing chart illustrating waveforms of signals which are input to a start control circuit of a display device according to an exemplary embodiment of the present disclosure.

Referring to FIGS. 5 and 9 together, when an initial third start signal VST3*i* and an initial fourth start signal VST4*i* output from the timing controller 140 are output at a normal timing, the start control circuit 150 can transmit the initial third start signal VST3*i* and the initial fourth start signal VST4*i* to the third gate driver 163 and the fourth gate driver 164, respectively. As described above, the third scan signal SCAN3 and the fourth scan signal SCAN4 can be input to the sub pixel SP at different timings from each other. Therefore, the timing controller 140 can output the initial third start signal VST3*i* and the initial fourth start signal VST4*i* to the third gate driver 163 and the fourth gate driver 164 at different timings from each other.

However, when the output timings of the initial third start signal VST3*i* and the initial fourth start signal VST4*i* overlap in the timing controller 140 due to an instantaneous error, the third gate driver 163 and the fourth gate driver 164 can simultaneously output the third scan signal SCAN3 and the fourth scan signal SCAN4 to the sub pixel SP. Therefore, the first initialization voltage, a second initialization voltage, and the anode reset voltage having a relatively high potential difference are simultaneously applied to the fourth pixel transistor PT4, the seventh pixel transistor PT7, and the eight pixel transistor PT8 which are turned on by the third scan signal SCAN3 and the fourth scan signal SCAN4. By doing this, the short defect and the burnt defect can occur. Therefore, the start control circuit 150 does not simultaneously output the initial third start signal VST3*i* and the initial fourth start signal VST4*i* output from the timing controller 140 to normally drive the third gate driver 163 and the fourth gate driver 164. That is, only the high level of third start signal VST3 and the high level of fourth start signal VST4, the low level of third start signal VST3 and the high level of fourth start signal VST4, or the high level of third start signal VST3 and the low level of fourth start signal VST4 can be output from the start control circuit 150 to the third gate driver 163 and the fourth gate driver 164. The start control circuit 150 can suppress the low level of third start signal VST3 and the low level of fourth start signal VST4 from being simultaneously output.

The pixel transistors PT4, PT7, and PT8 to which the third scan signal SCAN3 and the fourth scan signal SCAN4 are provided are p-type transistors so that the start control circuit 150 can suppress the gate turn-on voltage, and in this case, the low level of third start signal VST3 and the low level of the fourth start signal VST4 from being simultaneously output. Specifically, the start control circuit 150 includes a first control transistor 151, a second control transistor 152, a first control capacitor 153, and a second control capacitor 154. The first control transistor 151 and the second control transistor 152 of the start control circuit 150 can be different type of transistors from the type of the pixel transistors supplied with a scan signal input through the start control circuit 150. According to the exemplary embodiment of the present disclosure, a pixel transistor supplied with the scan signal output through the start control circuit 150 is a p-type transistor so that the first control transistor 151 and the second control transistor 152 are n-type transistors. The first control transistor 151 and the second control transistor 152 are turned on by a high level signal.

The first control transistor 151 includes a gate electrode to which the initial fourth start signal VST4*i* is input, a drain electrode to which the initial third start signal VST3*i* is input, and a source electrode connected to the third gate driver 163. The first control transistor 151 is turned on by the high level of initial fourth start signal VST4*i* to output the initial third start signal VST3*i* to the third gate driver 163 as the third start signal VST3. In contrast, when the initial fourth start signal VST4*i* is a low level, the first control transistor 151 is turned off to stop outputting the low level or high level of initial third start signal VST3*i* to the third gate driver 163.

The second control transistor 152 includes a gate electrode to which the initial third start signal VST3*i* is input, a drain electrode to which the initial fourth start signal VST4*i* is input, and a source electrode connected to the fourth gate driver 164. The second control transistor 152 which is turned on by the high level of initial third start signal VST3*i* can output the initial fourth start signal VST4*i* to the fourth gate driver 164 as the fourth start signal VST4. When the initial third start signal VST3*i* is a low level, the second control transistor 152 is turned off to stop outputting the low level or high level of initial fourth start signal VST4*i* to the fourth gate driver 164.

The first control capacitor 153 is connected between the source electrode of the first control transistor 151 and the ground. The first control capacitor 153 stores a voltage of the initial third start signal VST3*i* which flows while the first control transistor 151 is turned on. While the low level of fourth start signal VST4 is output to the fourth gate driver 164, the high level of third start signal VST3 can be input to the third gate driver 163. However, when the first control transistor 151 is turned off by the low level of initial fourth start signal VST4*i*, the high level of initial third start signal VST3*i* output from the timing controller 140 may not be transmitted to the third gate driver 163. Therefore, when the first control transistor 151 is turned off, a voltage stored in the first control capacitor 153 serves as the third start signal VST3 to be supplied to the third gate driver 163. Accordingly, while the third gate driver 163 and the timing controller 140 are not connected by the turned-off first control transistor 151, the first control capacitor 153 outputs the high level of third start signal VST3 instead, to normally drive the third gate driver 163.

The second control capacitor 154 is connected between the source electrode of the second control transistor 152 and the ground. The second control capacitor 154 stores a voltage of the initial fourth start signal VST4*i* which flows while the second control transistor 152 is turned on. While the low level of third start signal VST3 is output to the third gate driver 163, the high level of fourth start signal VST4 is input to the fourth gate driver 164. However, when the second control transistor 152 is turned off by the low level of third start signal VST3, the high level of initial fourth start signal VST4*i* output from the timing controller 140 can be transmitted to the fourth gate driver 164. Therefore, when the second control transistor 152 is turned off, a voltage stored in the second control capacitor 154 serves as the fourth start signal VST4 to be supplied to the fourth gate driver 164. Accordingly, while the fourth gate driver 164 and the timing controller 140 are not connected by the turned-off second control transistor 152, the second control capacitor 154 outputs the high level of fourth start signal VST4 instead, to normally drive the fourth gate driver 164.

In the meantime, the ground connected to the first control capacitor 153 and the second control capacitor 154 can be a system ground in the printed circuit board 130 or an external metal ground. When the ground is an external metal ground, a separate pad which is connected to the external metal ground is provided in the printed circuit board 130 to be connected to the first control capacitor 153 and the second control capacitor 154. However, the first control capacitor 153 and the second control capacitor 154 can be connected to various constant voltages instead of the system ground or the external metal ground, and are not limited thereto.

Figure 10:
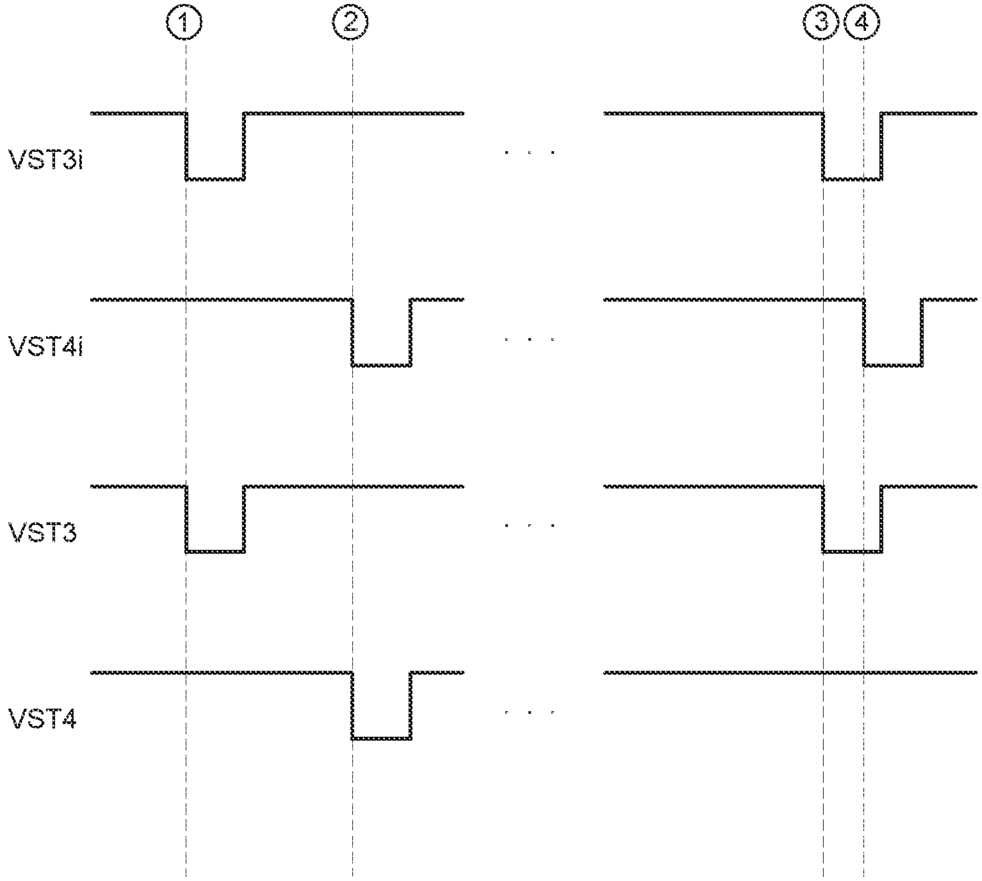
FIG. 10 is a timing chart illustrating waveforms of signals which are input to a start control circuit of a display device according to an exemplary embodiment of the present disclosure.

Referring to FIG. 10, at a timing (1), the initial third start signal VST3*i* is output as a low level and the initial fourth start signal VST4*i* is output as a high level, from the timing controller 140. That is, the third gate driver 163 outputs the third scan signal SCAN3 and the fourth gate driver 164 does not output the fourth scan signal SCAN4.

The first control transistor 151 of the start control circuit 150 can be turned on by the high level of initial fourth start signal VST4*i*, and the low level of initial third start signal VST3*i* passes through the turned-on first control transistor 151 to be output as the third start signal VST3 of the third gate driver 163.

The second control transistor 152 of the start control circuit 150 can be turned off by the low level of initial third start signal VST3*i*, and the initial fourth start signal VST4*i* may not be transmitted to the fourth gate driver 164 through the second control transistor 152. However, a voltage of the high level of initial fourth start signal VST4*i* which flows through the second control transistor 152 which is turned on before the timing (1) can be stored in the second control capacitor 154. Therefore, while the second control transistor 152 is turned off, a voltage stored in the second control capacitor 154 serves as the fourth start signal VST4 to be output to the fourth gate driver 164.

Next, at the timing (2), the initial third start signal VST3*i* is output as a high level and the initial fourth start signal VST4*i* is output as a low level, from the timing controller 140. That is, the third gate driver 163 does not output the third scan signal SCAN3 and the fourth gate driver 164 outputs the fourth scan signal SCAN4.

The first control transistor 151 of the start control circuit 150 can be turned off by the low level of initial fourth start signal VST4*i*, and the initial third start signal VST3*i* may not be transmitted to the third gate driver 163 through the first control transistor 151. However, a voltage of the high level of initial third start signal VST3*i* which flows through the first control transistor 151 which is turned on before the timing (2) can be stored in the first control capacitor 153. Therefore, while the first control transistor 151 is turned off, a voltage stored in the first control capacitor 153 serves as the third start signal VST3 to be output to the third gate driver 163.

The second control transistor 152 can be turned on by the high level of initial third start signal VST3*i*. Accordingly, the low level of initial fourth start signal VST4*i* can be output as a fourth start signal VST4 of the fourth gate driver 164 through the turned-on second control transistor 152.

At timings (3) and (4), while the low level of initial third start signal VST3*i* is output from the timing controller 140, the low level of initial fourth start signal VST4*i* is output due to an error. Only third gate driver 163, between the third gate driver 163 and the fourth gate driver 164 needs to output the third scan signal SCAN3, but the start signal is output toward both the third gate driver 163 and the fourth gate driver 164 due to the error.

At the timing (3), the first control transistor 151 can be turned on by the high level of initial fourth start signal VST4*i*. The low level of initial third start signal VST3*i* can be output toward the third gate driver 163 as a third start signal VST3, through the turned-on first control transistor 151. Simultaneously, the voltage of the low level of initial third start signal VST3*i* can be stored in the first control capacitor 153 together.

At the timing (3), the second control transistor 152 can be turned off by the low level of initial third start signal VST3*i*. However, a voltage of the high level of initial fourth start signal VST4*i* which flows through the second control transistor 152 which is turned on, before the timing (3) can be stored in the second control capacitor 154.

Next, at the timing (4), a low level of initial fourth start signal VST4*i* can be output from the timing controller 140 due to the instantaneous error. When the low level of initial fourth start signal VST4*i* is output, the first control transistor 151 can be turned off and the low level of initial third start signal VST3*i* may not flow through the source electrode and the drain electrode of the first control transistor 151 any-more. Instead, a voltage of the low level of initial third start signal VST3*i* stored in the first control capacitor 153 between the timings (3) and (4) serves as the third start signal VST3 to be output to the third gate driver 163.

Even though the low level of initial fourth start signal VST4*i* is output at the timing (4), the second control transistor 152 is turned off by the low level of initial third start signal VST3*i* so that the low level of initial fourth start signal VST4*i* can be not transmitted to the fourth gate driver 164. A voltage of the high level of initial fourth start signal VST4*i* which has been stored in advance in the second control capacitor 154 between the timings (3) and (4) serves as the fourth start signal VST4 to be output to the fourth gate driver 164.

Accordingly, even though the output timings of the low level of initial third start signal VST3*i* and the low level of initial fourth start signal VST4*i* overlap, only any one of the low level of initial third start signal VST3*i* and the low level of initial fourth start signal VST4*i* is output to the gate driver 160 by the first control transistor 151, the second control transistor 152, the first control capacitor 153, and the second control capacitor 154. Accordingly, the third scan signal SCAN3 and the fourth scan signal SCAN4 can be supplied to the sub pixel SP at different timings from each other and the short defect and the burnt defect can be minimized.

In the meantime, when the substantially same error occurs at the output timings of the low level of initial third start signal VST3*i* and the low level of initial fourth start signal VST4*i*, both the first control transistor 151 and the second control transistor 152 can be turned off. In this case, the low level of third start signal VST3 and the low level of fourth start signal VST4 are not supplied to the third gate driver 163 and the fourth gate driver 164 so that the third scan signal SCAN3 and the fourth scan signal SCAN4 may not be normally generated. However, even though the third scan signal SCAN3 and the fourth scan signal SCAN4 are not supplied to the sub pixel SP one time, as long as the third scan signal SCAN3 and the fourth scan signal SCAN4 are input to display images, one frame is a very short time. Accordingly, even though an error is generated in one frame, the images can be normally visible to the user. Therefore, even though the third scan signal SCAN3 and the fourth scan signal SCAN4 are not normally input to the sub pixel SP one time, the image can be normally visible to the user. Accordingly, the start control circuit 150 suppresses the low level of third start signal VST3 and the low level of fourth start signal VST4 from being simultaneously input to suppress the failure of the display device 100 due to the burnt error.

In the meantime, in the present disclosure, it is described that the start control circuit 150 is disposed only between the third gate driver 163 and the fourth gate driver 164 and the timing controller 140. However, the start control circuit 150 can be connected to any one of the first gate driver 161, the second gate driver 162, the third gate driver 163, and the fourth gate driver 164 depending on the design, but is not limited thereto.

Accordingly, in the display device 100 according to the exemplary embodiment of the present disclosure, the start control circuit 150 is formed between the timing controller 140 and the gate driver 160 so that the output timing of the start signal can be controlled so as not to overlap. The third gate driver 163 and the fourth gate driver 164 are supplied with the low level of third start signal VST3 and the low level of fourth start signal VST4 to generate the third scan signal SCAN3 and the fourth scan signal SCAN4, respectively. However, if the low level of third start signal VST3 and the low level of fourth start signal VST4 are simultaneously output to the gate driver 160 due to the error of the timing controller 140, the third scan signal SCAN3 and the fourth scan signal SCAN4 are simultaneously can be supplied to the sub pixel SP. In this case, the fourth transistor T4, the seventh transistor T7, and the eighth transistor which are controlled by the third scan signal SCAN3 and the fourth scan signal SCAN4 are turned on to simultaneously supply the first initialization voltage, the second initialization voltage, and the anode reset voltage to the sub pixel SP. In this case, an abnormal current flows and the burnt defect occurs due to the high potential difference of each of the first initialization voltage, the second initialization voltage, and the anode reset voltage, which can lead to the permanent failure of the display device 100. Accordingly, the start control circuit 150 is formed between the timing controller 140 and the gate driver 160 to suppress the low level of third start signal VST3 and the low level of fourth start signal VST4 from being simultaneously output to the gate driver 160. The start control circuit 150 includes the first control transistor 151 and the second control transistor 152. The first control transistor 151 is turned on only by the high level of initial fourth start signal VST4*i* from the timing controller 140 to transmit the initial third start signal VST3*i* to the third gate driver 163. The second control transistor 152 is turned on only by the high level of initial third start signal VST3*i* from the timing controller 140 to transmit the initial fourth start signal VST4*i* to the fourth gate driver 164. The first control transistor 151 and the second control transistor 152 are turned off by the low level of initial third start signal VST3*i* and the low level of initial fourth start signal VST4*i*. Accordingly, when both the initial third start signal VST3*i* and the initial fourth start signal VST4*i* are low levels, the start signal which is transmitted to the third gate driver 163 and the fourth gate driver 164 is blocked to suppress the burnt defect.

Figure 11:
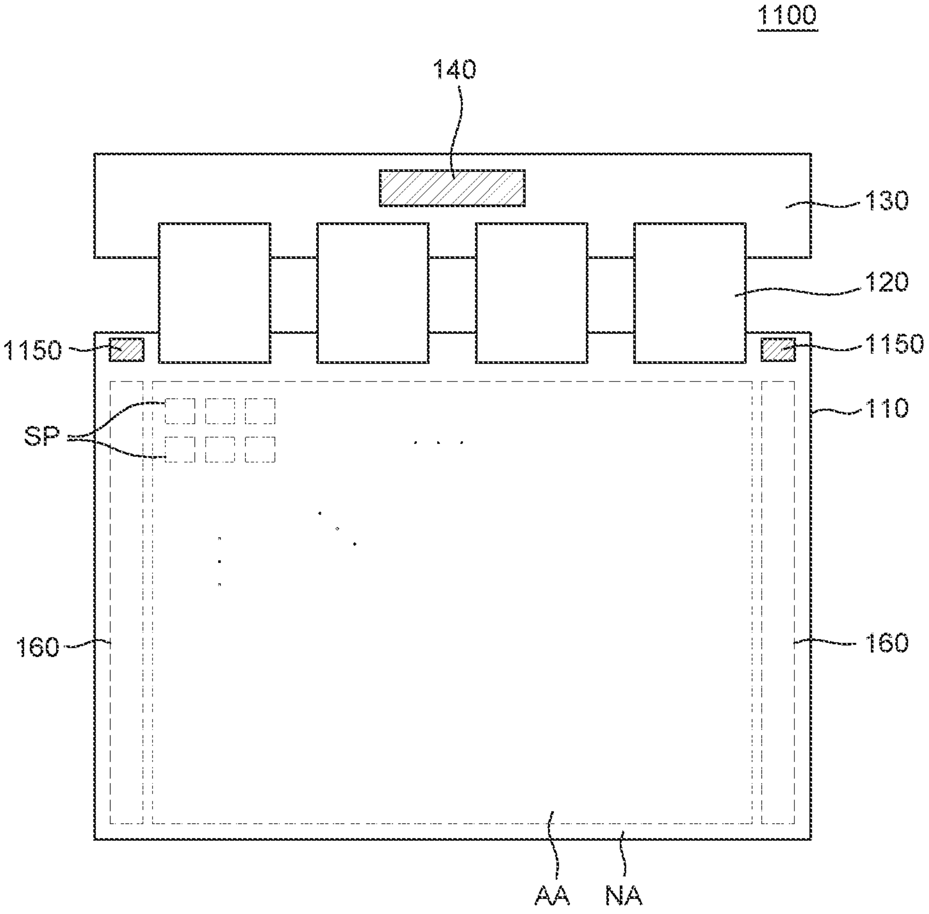
FIG. 11 is a schematic plan view of a display device according to another exemplary embodiment of the present disclosure.
Figure 12:
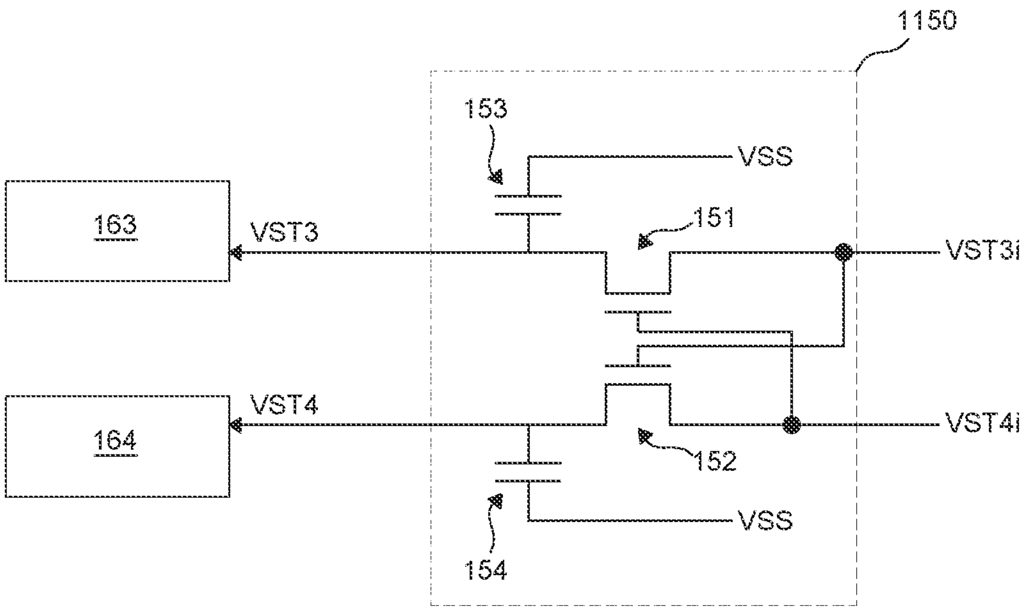
FIG. 12 is a circuit diagram of a start control circuit of a display device according to another exemplary embodiment of the present disclosure.

FIG. 11 is a schematic plan view of a display device according to another exemplary embodiment of the present disclosure. FIG. 12 is a circuit diagram of a start control circuit of a display device according to another exemplary embodiment of the present disclosure. One difference between a display device 1100 of FIGS. 11 and 12 and the display device 100 of FIGS. 1 to 10 is a start control circuit 1150, but other configurations are substantially the same or similar, so that a redundant description will be omitted or may be briefly provided.

Referring to FIG. 11, a start control circuit 1150 is disposed in a non-active area NA of a display panel 110 in the display device 1100. The start control circuit 1150 is disposed in the non-active area NA to be electrically connected between the timing controller 140 and the gate driver 160. The start control circuit 1150 is formed by two transistors and two capacitors so that an occupied area is not so large. Accordingly, the start control circuit 1150 can be easily disposed in the non-active area NA without enlarging the area of the non-active area NA of the display panel 110.

Referring to FIG. 12, the start control circuit 1150 includes a first control transistor 151, a second control transistor 152, a first control capacitor 153, and a second control capacitor 154.

The first control capacitor 153 is connected between the source electrode of the first control transistor 151 and the low potential power line VSS. The first control capacitor 153 can store a differential voltage of a voltage of the initial third start signal VST3*i* which flows while the first control transistor 151 is turned on and the low potential voltage. Thereafter, a voltage stored in the first control capacitor 153 serves as a high level of third start signal VST3 while the first control transistor 151 is turned off to be output to the third gate driver 163 so that the third gate driver 163 can be normally driven.

The second control capacitor 154 is connected between the source electrode of the second control transistor 152 and the low potential power line VSS. The second control capacitor 154 can store a differential voltage of a voltage of the initial fourth start signal VST4*i* which flows while the second control transistor 152 is turned on and the low potential voltage. A voltage stored in the second control capacitor 154 serves as a high level of fourth start signal VST4 while the second control transistor 152 is turned off to be output to the fourth gate driver 164 so that the fourth gate driver 164 can be normally driven.

Accordingly, in the display device 1100 according to another exemplary embodiment of the present disclosure, the start control circuit 1150 is disposed in the non-active area NA of the display panel 110 to suppress an abnormal start signal from being output to the gate driver 160. The start control circuit 1150 is formed by two transistors and two capacitors so that the start control circuit 1150 can be easily disposed in the non-active area NA without enlarging the area of the non-active area NA. In the meantime, the low potential power line VSS connected to a plurality of sub pixels SP of the active area AA extends to the non-active area NA to be supplied with the low potential power voltage from the plurality of flexible films 120 and the printed circuit board 130. Therefore, instead of forming a separate ground, the start control circuit 1150 is connected to the low potential power line VSS to form the first control capacitor 153 and the second control capacitor 154. Accordingly, the configuration of the start control circuit 1150 is not complex, but is simple and the start control circuit 1150 can be implemented using the low potential power line VSS which has been originally formed in the non-active area NA so that a degree of freedom of design can be improved.

The exemplary embodiments of the present disclosure can also be described as follows:

According to an aspect of the present disclosure, there is provided a display device. The display device includes a display panel in which a plurality of sub pixels connected to a plurality of scan lines is defined; a gate driver which supplies a scan signal to the plurality of scan lines; a timing controller which outputs a plurality of start signals to the gate driver; and a start control circuit which is connected between the timing controller and the gate driver to transmit the start signal to the gate driver, and when at least two start signals, among a plurality of start signals output from the timing controller, are a gate turn-on voltage of a pixel transistor to which the scan signal is supplied, the start control circuit stops outputting the plurality of start signals.

The gate driver can include a first gate driver which generates a first scan signal based on a first start signal among the plurality of start signals; a second gate driver which generates a second scan signal based on a second start signal among the plurality of start signals; a third gate driver which generates a third scan signal based on a third start signal among the plurality of start signals; and a fourth gate driver which generates a fourth scan signal based on a fourth start signal among the plurality of start signals.

Each of the plurality of sub pixels can include a first pixel transistor having a source electrode connected to a first node, a gate electrode connected to a second node, and a drain electrode connected to a third node; a second pixel transistor connected between the first node and a data line; a third pixel transistor connected between the gate electrode and the drain electrode of the first pixel transistor; a fourth pixel transistor connected between the third node and a first initialization line; a seventh pixel transistor connected between an anode and an anode reset line; an eighth pixel transistor connected between the third node and a second initialization line; and a light emitting diode including the anode.

The scan line can include a first scan line connected between the first gate driver and a gate electrode of the third pixel transistor; a second scan line connected between the second gate driver and a gate electrode of the second pixel transistor; a third scan line connected between the third gate driver and a gate electrode of the seventh pixel transistor and between the third gate driver and a gate electrode of the eighth pixel transistor; and a fourth scan line connected between the fourth gate driver and a gate electrode of the fourth pixel transistor, and the third gate driver can output the third scan signal to the third scan line at a different timing from that of the fourth gate driver.

The start control circuit can be connected between the third gate driver and the timing controller and between the fourth gate driver and the timing controller.

The start control circuit can include a first control transistor which is turned on or turned off by the fourth start signal output from the timing controller and transmits the third start signal to the third gate driver; and a second control transistor which is turned on or turned off by the third start signal output from the timing controller and transmits the fourth start signal to the fourth gate driver.

The fourth pixel transistor, the seventh pixel transistor, and the eighth pixel transistor can be p-type transistors and the first control transistor and the second control transistor can be n-type transistors.

When the third start signal is a high level and the fourth start signal is a low level, the first control transistor can be turned off to stop outputting the third start signal to the third gate driver, and the second control transistor can be turned on to output the fourth start signal to the fourth gate driver.

When the third start signal is a low level and the fourth start signal is a low level, both the first control transistor and the second control transistor can be turned off to stop outputting the third start signal and the fourth start signal to the third gate driver and the fourth gate driver.

The start control circuit can further include a first control capacitor having one end connected between the first control transistor and the third gate driver; and a second control capacitor having one end connected between the second control transistor and the fourth gate driver, and a voltage of the third start signal can be stored in the first control capacitor and a voltage of the fourth start signal is stored in the second control capacitor.

According to another aspect of the present disclosure, there is provided a display device. The display device includes a display panel in which a plurality of sub pixels connected to a plurality of scan lines is defined; a gate driver which is connected to the plurality of scan lines and includes a first gate driver, a second gate driver, a third gate driver, and a fourth gate driver; a timing controller which outputs a first start signal, a second start signal, a third start signal, and a fourth start signal to the first gate driver, the second gate driver, the third gate driver, and the fourth gate driver, respectively; and a start control circuit which transmits the third start signal and the fourth start signal to the third gate driver and the fourth gate driver, respectively, at different timings from each other.

The start control circuit can transmit a high level of the fourth start signal to the fourth gate driver while transmitting a low level of the third start signal to the third gate driver.

The start control circuit can transmit a high level of the third start signal to the third gate driver while transmitting a low level of the fourth start signal to the fourth gate driver.

The start control circuit can include a first control transistor which is turned on by a high level of the fourth start signal to transmit the third start signal to the third gate driver; and a second control transistor which is turned on by a high level of the third start signal to transmit the fourth start signal to the fourth gate driver.

When both the third start signal and the fourth start signal are low levels, the first control transistor and the second control transistor can be turned off to stop outputting the third start signal and the fourth start signal to the third gate driver and the fourth gate driver.

Any one of a high level of third start signal and a high level of fourth start signal, a low level of third start signal and a high level of fourth start signal, or a high level of third start signal and a low level of fourth start signal can be transmitted from the start control circuit to the third gate driver and the fourth gate driver.

The start control circuit can further include a first control capacitor which is connected between the first control transistor and the third gate driver to store a voltage of the third start signal transmitted through the first control transistor; and a second control capacitor which is connected between the second control transistor and the fourth gate driver to store a voltage of the fourth start signal transmitted through the second control transistor, and the first control capacitor can output the third start signal to the third gate driver while the first control transistor is turned off, and the second control capacitor can output the fourth start signal to the fourth gate driver while the second control transistor is turned off.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure.

What is claimed is:

1. A display device, comprising:

a display panel in which a plurality of sub pixels connected to a plurality of scan lines is defined;

a gate driver which supplies a scan signal to the plurality of scan lines;

a timing controller which outputs a plurality of start signals to the gate driver; and a start control circuit connected between the timing controller and the gate driver to transmit one of the plurality of start signals to the gate driver, wherein the gate driver includes:

a first gate driver which generates a first scan signal based on a first start signal among the plurality of start signals;

a second gate driver which generates a second scan signal based on a second start signal among the plurality of start signals;

a third gate driver which generates a third scan signal based on a third start signal among the plurality of start signals; and a fourth gate driver which generates a fourth scan signal based on a fourth start signal among the plurality of start signals, wherein the start control circuit is connected between the third gate driver and the timing controller and between the fourth gate driver and the timing controller, and wherein when at least two start signals, among the plurality of start signals output from the timing controller, are a gate turn-on voltage of a pixel transistor to which the scan signal is supplied, the start control circuit stops outputting the plurality of start signals.

2. The display device according to claim 1, wherein each of the plurality of sub pixels includes:

a first pixel transistor having a source electrode connected to a first node, a gate electrode connected to a second node, and a drain electrode connected to a third node;

a second pixel transistor connected between the first node and a data line;

a third pixel transistor connected between the gate electrode and the drain electrode of the first pixel transistor;

a fourth pixel transistor connected between the third node and a first initialization line;

a seventh pixel transistor connected between an anode and an anode reset line;

an eighth pixel transistor connected between the third node and a second initialization line; and a light emitting diode including the anode.

3. The display device according to claim 2, wherein the plurality of scan lines includes:

a first scan line connected between the first gate driver and a gate electrode of the third pixel transistor;

a second scan line connected between the second gate driver and a gate electrode of the second pixel transistor;

a third scan line connected between the third gate driver and a gate electrode of the seventh pixel transistor and between the third gate driver and a gate electrode of the eighth pixel transistor; and a fourth scan line connected between the fourth gate driver and a gate electrode of the fourth pixel transistor, and wherein the third gate driver outputs the third scan signal to the third scan line at a different timing from that of the fourth gate driver.

4. The display device according to claim 2, wherein the start control circuit includes:

a first control transistor which is turned on or turned off by the fourth start signal output from the timing controller and transmits the third start signal to the third gate driver; and a second control transistor which is turned on or turned off by the third start signal output from the timing controller and transmits the fourth start signal to the fourth gate driver.

5. The display device according to claim 4, wherein the fourth pixel transistor, the seventh pixel transistor, and the eighth pixel transistor are p-type transistors and the first control transistor and the second control transistor are n-type transistors.

6. The display device according to claim 5, wherein when the third start signal is at a high level and the fourth start signal is at a low level, the first control transistor is turned off to stop outputting the third start signal to the third gate driver, and the second control transistor is turned on to output the fourth start signal to the fourth gate driver.

7. The display device according to claim 5, wherein when the third start signal is at a low level and the fourth start signal is at a low level, both the first control transistor and the second control transistor are turned off to stop outputting the third start signal and the fourth start signal to the third gate driver and the fourth gate driver.

8. The display device according to claim 5, wherein the start control circuit further includes:

a first control capacitor having one end connected between the first control transistor and the third gate driver; and a second control capacitor having one end connected between the second control transistor and the fourth gate driver, and wherein a voltage of the third start signal is stored in the first control capacitor and a voltage of the fourth start signal is stored in the second control capacitor.

9. A display device, comprising:

a display panel in which a plurality of sub pixels connected to a plurality of scan lines is defined;

a gate driver which is connected to the plurality of scan lines and includes a first gate driver, a second gate driver, a third gate driver, and a fourth gate driver;

a timing controller which outputs a first start signal, a second start signal, a third start signal, and a fourth start signal to the first gate driver, the second gate driver, the third gate driver, and the fourth gate driver, respectively; and a start control circuit which transmits the third start signal and the fourth start signal to the third gate driver and the fourth gate driver, respectively, at different timings from each other, wherein the start control circuit includes:

a first control transistor which is turned on by a first level of the fourth start signal to transmit the third start signal to the third gate driver, the fourth start signal including the first level and a second level different from the first level; and a second control transistor which is turned on by a third level of the third start signal to transmit the fourth start signal to the fourth gate driver, the third start signal including the third level and a fourth level different from the third level, wherein the first gate driver generates a first scan signal based on the first start signal, the second gate driver generates a second scan signal based on the second start signal, the third gate driver generates a third scan signal based on the third start signal, and the fourth gate driver generates a fourth scan signal based on the fourth start signal, and wherein the start control circuit is connected between the third gate driver and the timing controller and between the fourth gate driver and the timing controller.

10. The display device according to claim 9, wherein the start control circuit transmits a high level of the fourth start signal to the fourth gate driver while transmitting a low level of the third start signal to the third gate driver.

11. The display device according to claim 10, wherein the start control circuit transmits a high level of the third start signal to the third gate driver while transmitting a low level of the fourth start signal to the fourth gate driver.

12. The display device according to claim 9, wherein when both the third start signal and the fourth start signal are at low levels, the first control transistor and the second control transistor are turned off to stop outputting the third start signal and the fourth start signal to the third gate driver and the fourth gate driver.

13. The display device according to claim 9, wherein any one of a high level of the third start signal and a high level of the fourth start signal, a low level of the third start signal and a high level of the fourth start signal, or a high level of the third start signal and a low level of the fourth start signal is transmitted from the start control circuit to the third gate driver and the fourth gate driver.

14. The display device according to claim 13, wherein the start control circuit further includes:

a first control capacitor which is connected between the first control transistor and the third gate driver to store a voltage of the third start signal transmitted through the first control transistor; and a second control capacitor which is connected between the second control transistor and the fourth gate driver to store a voltage of the fourth start signal transmitted through the second control transistor, and wherein the first control capacitor outputs the third start signal to the third gate driver while the first control transistor is turned off, and wherein the second control capacitor outputs the fourth start signal to the fourth gate driver while the second control transistor is turned off.

* * * * *